C. W. McCORMICK.
SHAFT COUPLING.
APPLICATION FILED DEC. 5, 1919.
1,343,272.
Patented June 15, 1920.
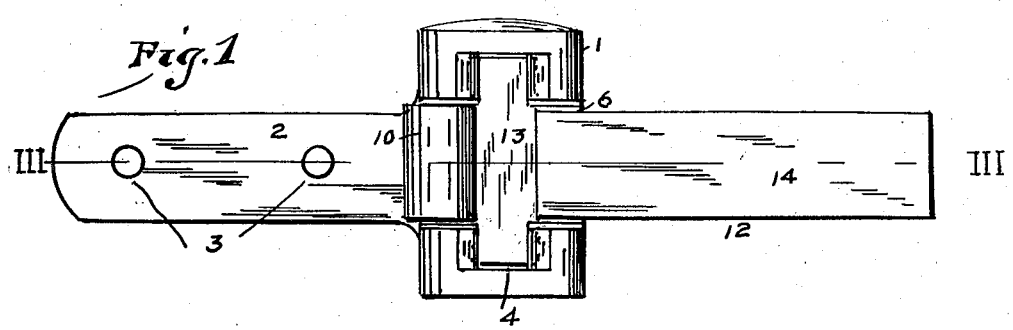
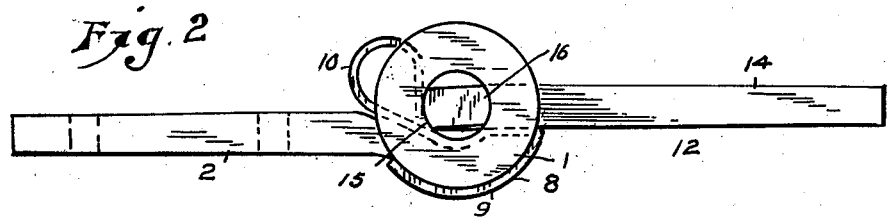
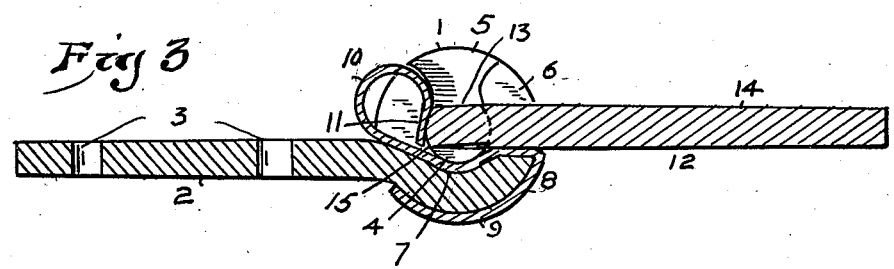
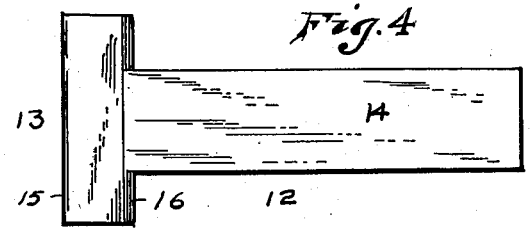
WITNESSES
R. F. Dilworth
INVENTOR
Charles W. McCormick
By Jack Snyder
Attorney

UNITED STATES PATENT OFFICE.

CHARLES W. McCORMICK, OF PITTSBURGH, PENNSYLVANIA.

SHAFT-COUPLING.

1,343,272.  Specification of Letters Patent.  Patented June 15, 1920.

Application filed December 5, 1919. Serial No. 342,672.

*To all whom it may concern:*

Be it known that I, CHARLES W. McCORMICK, a citizen of the United States, residing at Pittsburgh, in the county of Allegheny and State of Pennsylvania, have invented certain new and useful Improvements in Shaft-Couplings, of which the following is a specification.

This invention relates to new and useful improvements in vehicle shaft couplings, and the primary objects thereof are to provide a device of the character described, in a manner as hereinafter set forth, whereby the shafts of a vehicle may be readily and conveniently attached to the vehicle or detached from the vehicle, and which is provided with a detachable or removable anti-rattle element.

Further objects of this invention are to provide a device of the type stated, which is comparatively simple in its construction and arrangement, strong, durable and efficient in its use, and inexpensive to manufacture.

To the accomplishment of these and such other objects as may hereinafter appear, the invention consists of the novel construction, combination and arrangement of parts herein specifically described and illustrated in the accompanying drawing, wherein is shown an embodiment of the invention, but it is to be understood that the device shown is merely illustrating and that various changes in the form, proportions and minor details of construction may be resorted to, without departing from the principle or sacrificing any of the advantages of the invention, which come within the scope of the claims hereunto appended.

In the drawing forming a portion of this specification and wherein like numerals of reference designate corresponding parts throughout the several views:

Figure 1 is a top plan view of a vehicle shaft coupling in accordance with this invention.

Fig. 2 is a side elevation thereof.

Fig. 3 is a sectional view on line III—III, Fig. 1.

Fig. 4 is a top plan view of the coupling member.

Referring to the drawing in detail, the vehicle shaft coupler, in accordance with this invention, comprises the coupling head 1, formed integrally, intermediate of its ends, with the right angularly disposed and rearwardly extending arm 2. The arm 2 is provided with the apertures 3, through which, by means of a clip, the coupling head 1 is adapted to be attached to the front axle of a vehicle, in the usual manner.

The head 1 is cylindrical in contour and is formed with a longitudinally extending bore or socket 4 and slot 5, the latter extending upwardly from the socket 4 to the outer periphery of the head 1. The head 1 is further provided with a centrally disposed transversely extending slot 6, opening upwardly, and in alinement with the rearwardly extending arm 2.

The bottom of the transverse slot 6, at the point of passage across the lower periphery of the socket 4, is recessed, as at 7, to a depth commensurate to the thickness of the flat spring 8, so that when the latter is seated in the slot 6 the top surface thereof will form a portion of the lower periphery of the wall of the socket 4 and be flush therewith.

The spring 8 is securely, though detachably, held in the slot 6, by the engagement thereof in the recess 7 in conjunction with the clamping action of the forward end 9 which is bent rearwardly to closely embrace the outer lower periphery of the head 1, as clearly shown in Fig. 1, of the drawing. The rear portion of the spring 8 is looped forwardly, as at 10, in a manner to permit the end 11 thereof to normally extend into the socket 4.

The coupling member 12, used in connection with the coupling head 1, is substantially T-shaped and comprises the cross-bar 13 having an arm 14, which latter is adapted to be welded to the vehicle shaft irons to form an integral portion thereof.

The cross-bar 13 is of a greater width than thickness and has its longitudinal edges 15 and 16 rounded to snugly engage the wall of the socket 4 in the head 1 in which the cross-bar 13 is adapted to be seated and operate.

The thickness of the cross-bar 13 is commensurate to the width of the longitudinal slot 5 and the width of the cross-bar 13 is commensurate to the diameter of the socket 4, consequently when the cross-bar 13 is inserted in the socket 4 it must be positioned perpendicularly edgewise while being passed through the slot 5. When the coupling is in the attached position for use, the cross-bar 13 will extend horizontally edgewise in the socket 4 in a plane parallel with the rearwardly extending arm 2 and cannot be removed from the socket 4 unless turned vertically edgewise to permit its passage through the slot 5.

The upper edges of the longitudinal slot 5 are rounded to facilitate the insertion of the coupling member 12 in the socket 4.

When the coupling is in the attached position for use, the end 11, of the spring 8, will tensionally engage the rear end of the cross-bar 13 and tend to force same forwardly thereby preventing rattling of the coupling elements.

For attaching the shafts to a vehicle it is only necessary to tilt the same upwardly to permit the insertion of the cross-bar 13, carried thereby, in the socket 4 carried in the head attached to the forward axle of the vehicle. When the shafts are in the normal position in use they cannot be accidentally uncoupled as the cross-bar 13 is then positioned horizontally edgewise within the socket 4.

It will be obvious that a shaft coupling accordance with this invention is readily and conveniently operable for attaching or detaching the shafts to or from a vehicle, and that the spring 8, if broken or useless for any reason, may be readily replaced by another without the use of bolts or rivets.

What I claim is:—

1. A shaft coupling comprising a coupling head adapted to be connected with the axle of a vehicle and provided with a socket and a pair of slots opening into the socket, a flat spring extended through said slots and socket and having its forward portion overlapping the lower portion of said head, said spring having its rear portion bent forwardly upon itself and extended into the socket, and a coupling member seated in the socket and bearing against the spring.

2. A shaft coupling comprising a coupling head adapted to be connected with the axle of a vehicle and provided with a socket and a pair of slots opening into the socket, a flat spring extended through said slots and socket and having its forward portion overlapping the lower portion of said head, said spring having its rear portion bent forwardly upon itself and extended into the socket, and a coupling member seated in the socket and bearing against the spring, said spring further having a curvilinear portion forming a portion of the wall of the said socket.

3. A device for the purpose set forth comprising a coupling head adapted to be connected to the axle of a vehicle and provided with a socket having the bottom thereof recessed, a longitudinal slot opening upwardly and extending into said socket, a transverse slot opening upwardly and extending into said socket, a detachable spring seated in said transverse slot overlapping the lower portion of said head and having a curvilinear portion mounted in said recess to provide a continuation of the wall of the socket, a T-shaped coupling member adapted to be engaged and operate in said socket, the rear end of said spring being bent forwardly to bear against the said coupling member in said socket, substantially as described.

In testimony whereof I affix my signature.

CHARLES W. McCORMICK.